United States Patent [19]
Legare et al.

[11] Patent Number: 5,886,837
[45] Date of Patent: Mar. 23, 1999

[54] SEGMENTED FRESNEL LENS FRAME

[75] Inventors: David J. Legare, New Hartford; David R. Jennings, Lycoming, both of N.Y.

[73] Assignee: The United States of America as represented by the Secretary of the Air Force, Washington, D.C.

[21] Appl. No.: 113,014

[22] Filed: Jun. 26, 1998

Related U.S. Application Data

[63] Continuation of Ser. No. 82,206, Jun. 24, 1993, abandoned.

[51] Int. Cl.$^6$ ........................................................ G02B 7/02
[52] U.S. Cl. ........................... 359/827; 359/819; 359/742
[58] Field of Search .................................. 359/811, 819, 359/827, 741, 742

[56] References Cited

U.S. PATENT DOCUMENTS

| | | | |
|---|---|---|---|
| 3,661,385 | 5/1972 | Schneider | 359/742 |
| 4,846,554 | 7/1989 | Mori et al. | 359/827 |
| 4,906,076 | 3/1990 | Schwartz | 359/741 |
| 5,208,700 | 5/1993 | Harris et al. | 359/742 |
| 5,442,178 | 8/1995 | Baldwin | 359/742 |

Primary Examiner—Loha Ben
Attorney, Agent, or Firm—Robert L. Nathans

[57] ABSTRACT

Method of assembling a large, lightweight, composite optical device such as a mirror or lens, includes providing a plurality of flat, lightweight optical element sections, fastening each optical element section to an associated frame segment to provide a plurality of optical elements and detachably fastening a plurality of the optical elements together in a manner causing all of them to lie in a single plane. After use, the device is disassembled and the optical elements are stacked in a compact mass to make them readily portable.

7 Claims, 4 Drawing Sheets

SECTION B-B

SECTION A-A

US 5,886,837

SEGMENTED FRESNEL LENS FRAME

This is a continuing application of Ser. No. 08/082,206, filed Jun. 24, 1993, now abandoned.

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical elements and more particularly to the assembly and disassembly of optical elements.

It is desirable to provide an easy means of repeatedly disassembling or segmenting and reassembling components of a large optical element which is thus made highly portable and can be readily carried by one person from place to place. In order to enable this portability, the optical device should also be light and highly compact after being disassembled so as to be carried by the person to render it "man-packable".

One example would utilize the large optical element such as a lens or mirror, as the objective of a large collapsible telescope. The telescope body itself could also be collapsible thus allowing for a very lightweight, easily transportable telescope having a substantial size when reassembled. It is thus desirable to replace, for example, an eighteen inch diameter conventional cassegrain reflector system which can not be collapsed and which can weigh fifty pounds or more, with such a lightweight, collapsible and portable reflector system to render the telescope portable. The resulting telescope could thus weigh only a few pounds and be sufficiently compact to be backpack-transportable.

It is also desirable to provide a collapsible, lightweight, portable optical "antenna" for use with a field transportable laser beam communication receiver. The best way to improve receiver gain is to collect more of the incoming laser beam signal energy by employing a larger optical collector or "antenna". It would also be desirable to provide a readily transportable solar energy collector for power generation in the field. The electrical power generated would be useful for energizing remote radio transmitters or other instruments in the field, in support of scientific experiments or for military applications. A lightweight, collapsible optical "antenna" or solar energy collector would also have numerous applications in space for use on satellites etc.

In the above applications, it would be most desirable to employ some type of flat, light-weight optic such as a plastic fresnel lens. A simple fresnel lens could satisfy most of the aforesaid applications. However, due to their generally poor imaging capability, fresnel lenses should mainly be used for optical energy collection, such as "antennas" for optical communications and lidar systems or as solar power concentrators. High quality imaging can best be accomplished with diffractive or binary optical elements. Although essentially the same in size and general appearance as a fresnel lens, these elements have a much denser groove spacing and provide for near diffraction-limited performance which is comparable to or better than a basic curved lens or mirror. The only potential problem with using a diffractive optic as the major light gathering element of a telescope is its optical wavelength sensitivity which can cause chromatic distortion when used with broadband light sources such as white light. However, recent independent developments in diffractive optics technology have provided solutions to this problem via small corrective optical elements which can be incorporated in the light path. Thus a high performance imaging telescope which is light weight and collapsible could be implemented by the present invention.

Fresnel, diffractive and binary optical elements can be produced on a number of different substrates including glass, metals and plastics. Furthermore, they can be inexpensively molded by plastic injection or compression molding from a master copy. Fabrication from a reflective material produces a mirror. A mirror can also be produced by providing an appropriate reflective coating on a transmissive optic. Use of the optic in the present invention can be accomplished by producing the segments as separate units, or simply by cutting the optical element into separate sections after its fabrication.

BRIEF SUMMARY OF THE INVENTION

In accordance with one embodiment of the invention, several flat, lightweight, optical element sections are affixed to associated frame segments to produce several optical elements. The optical elements are fastened together by detachable fasteners to form a large lightweight composite lens or mirror. After the device has been used in the field, the several optical elements are detached from each other and can be stacked to form a compact, and hence portable unit to be readily transported by a person from place to place.

BRIEF DESCRIPTION OF THE DRAWINGS

Various features of the invention will become clearer upon study of the following description taken in conjunction with the drawings in which.

DETAILED DESCRIPTION OF AN EMBODIMENT OF THE INVENTION

The following detailed description is directed toward the use of a fresnel lens as the optical element to be segmentally framed. However, other types of elements such as diffractive or binary optics can be used. It is important to note that due to the extremely narrow groove spacing employed in diffractive or binary optical elements, as compared to the basic fresnel lens, a higher degree of accuracy is required in the frame construction to produce proper alignment of the grooves in the assembled lens.

The lenses can be made into a variety of shapes, such as a rectangular shape, in accordance with the invention. The following description will be directed to an exemplary circular Fresnel lens with the frame structure configured accordingly. Of course a Fresnel mirror could be assembled in a similar fashion. Varying numbers of lens sections and frame segments can also be employed.

Figure 1A:
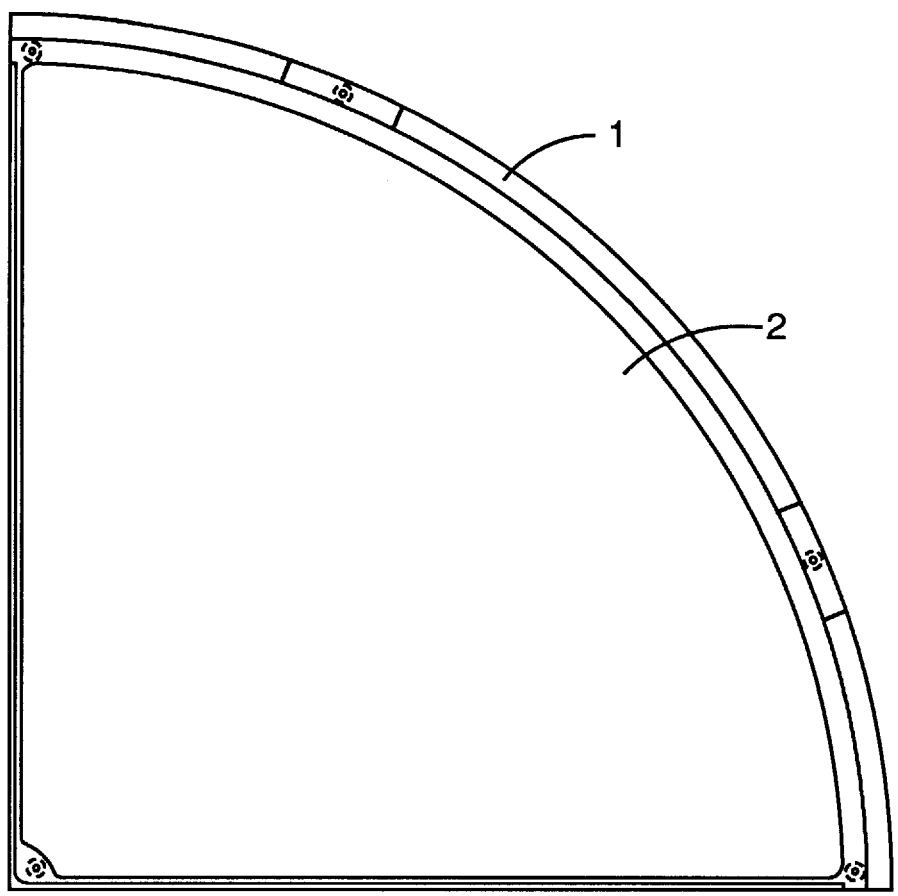
FIGS. 1a and 1b show a single lens frame segment with a segmented lens section therein.
Figure 1B:
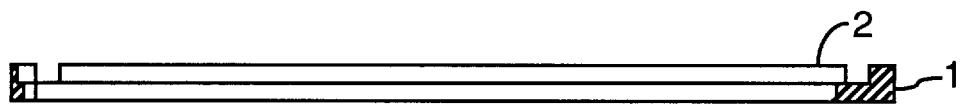
Figure 2:
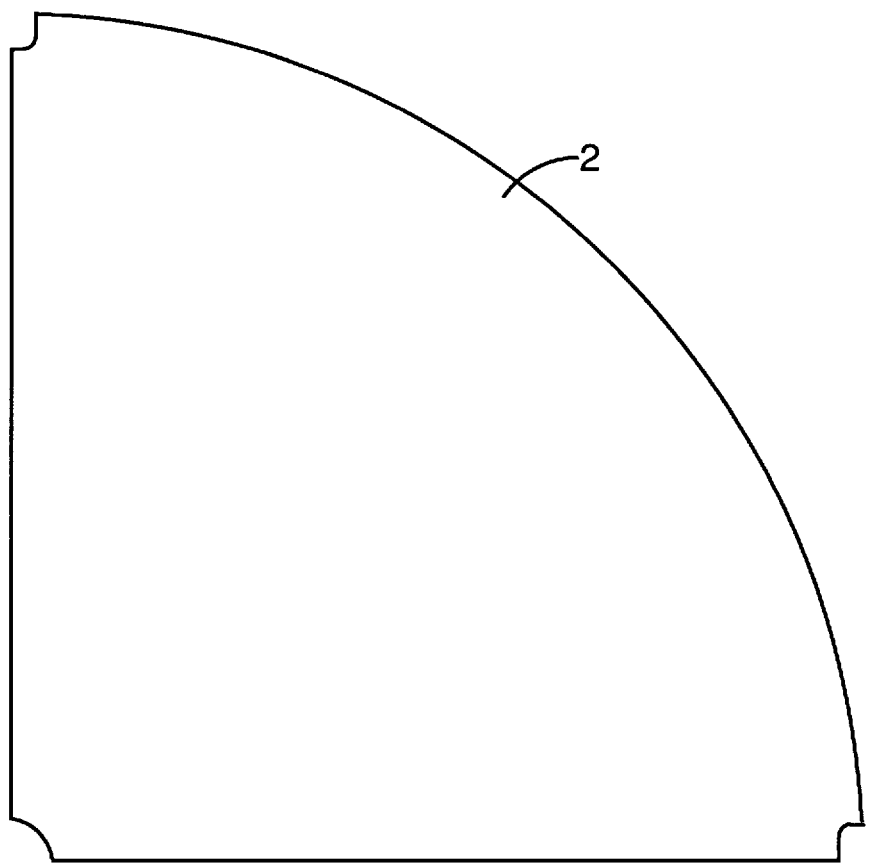
FIG. 2 shows the lens section apart from a single lens frame segment.
Figure 3:
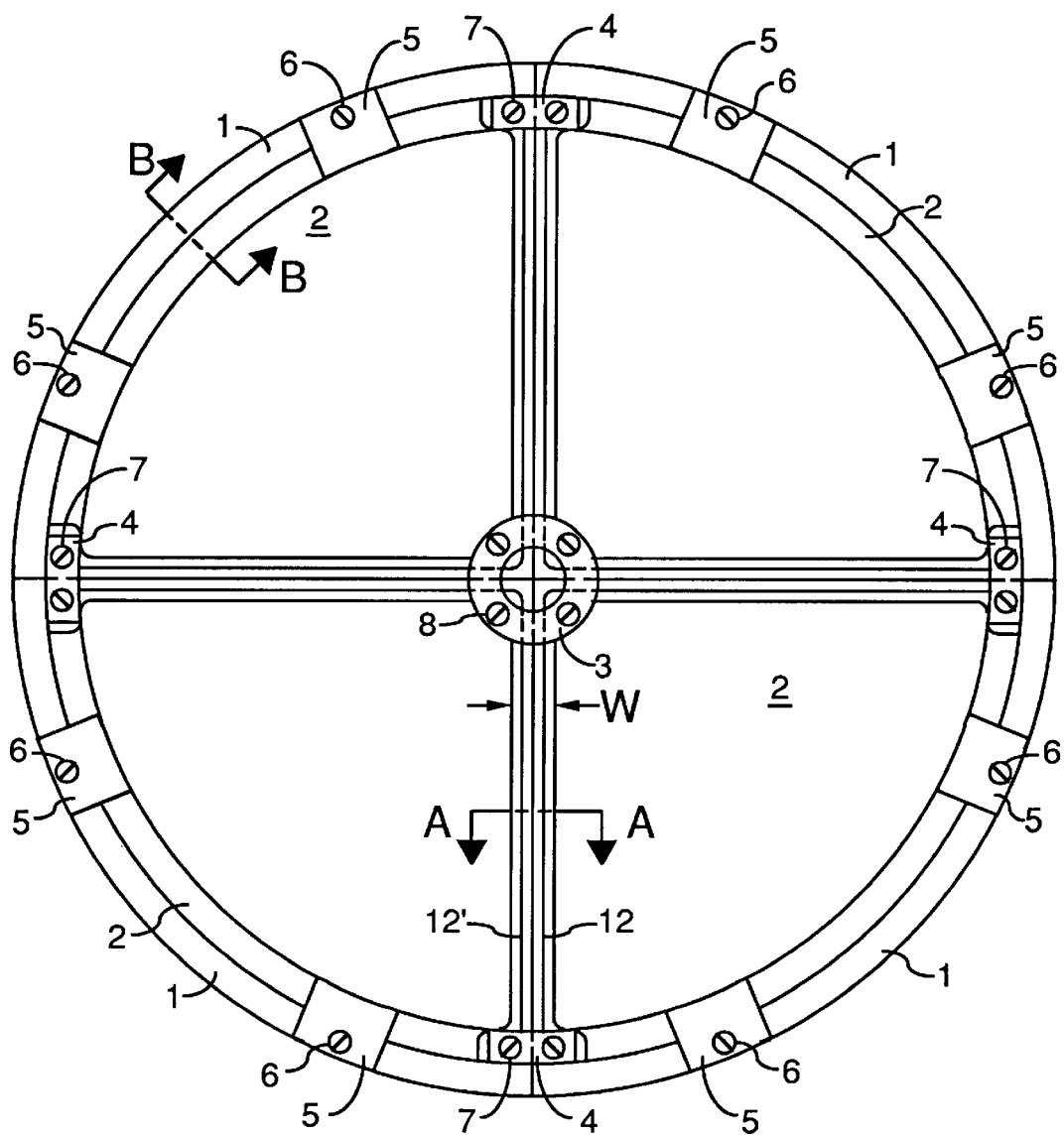
FIG. 3 shows the fully assembled lens frame containing four lens sections.
Figure 6:
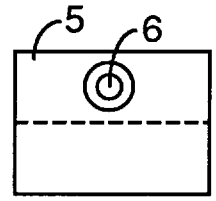
FIG. 6 shows a lens section retainer clamp.
Figure 7:
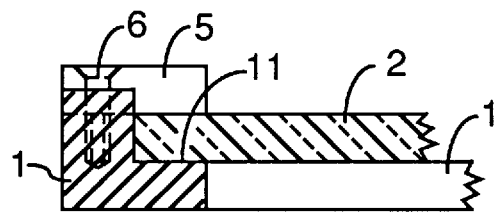
FIGS. 7 and 8 reveal cross-sections taken through FIG. 3.

FIGS. 1a and 1b show a single wedge shaped lens frame segment 1 with a wedge shaped lens section 2 positioned therein. The single lens section, apart from the lens frame segment 1, is shown in FIG. 2. Eight lens section retainer clamps 5, of which one is shown in FIG. 6, are mounted upon outer rim portions of the frame segments as shown in FIG. 3 by means of screws and screw holes 6, to hold the lens sections firmly in place within their associated frame segments 1, thereby to create a two piece "building block" optical element. This is also shown in FIG. 7 which is a partial cross-section B—B taken through the outer frame segment 1. The lower edge portion of clamped down lens section 2 rests against ledge portion 11 of the outer frame segment. The L shaped clamp 5 is shown held in place by a screw passing through screw hole 6.

Figure 4:
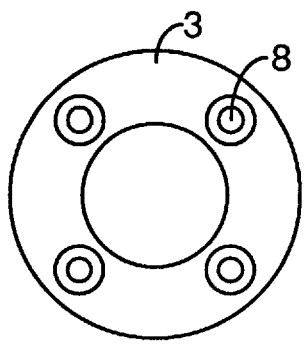
FIG. 4 shows a central clamping means used to firmly hold the corners of each lens frame segment adjacent to each other.
Figure 5:
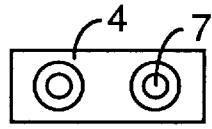
FIG. 5 shows a frame assembly clamp used to hold the outer edge portions of two frame segments adjacent to each other.
Figure 8:
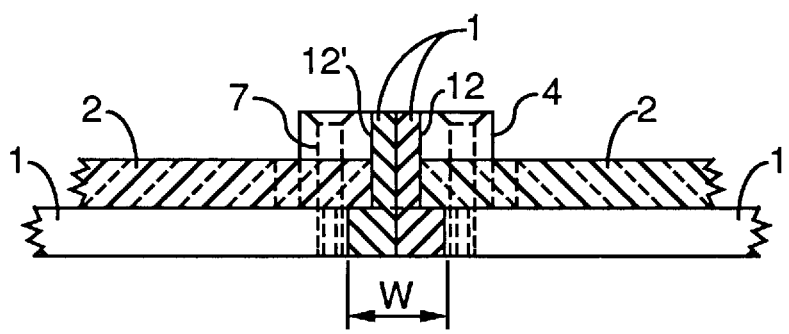

FIG. 4 shows a central clamping means or detachable fastener 3 used to firmly hold the corners of each lens frame segment adjacent to each other as shown in the center of FIG. 3. The screw holes 8 in the central clamp 3, allow the clamp to be anchored via screws through corresponding threaded holes in the corners of frame segments 1 to maintain the lens frame segments and lens sections 2 in a coplanar relationship. Four frame assembly clamps or detachable fasteners 4, one of which is shown in FIG. 5, are fastened to adjacent outer edge portions of the frame segments 1 via screws passing through screw holes 7 as shown in FIG. 3. FIG. 8 shows the adjoining edge portions 12 and 12' of two adjacent lens frame segments; this cross-section A—A points toward frame assembly clamp 4 of FIG. 5, holding the outer edge portions of adjacent frame segments together. See also FIG. 3. The detachable fasteners thus maintain the lens sections co-planar with respect to each other as the lens section support ledges are maintained in co-planar relationship.

As can be seen in FIGS. 3 and 8, the radial frame edge portions 12 and 12' are quite thin, and are made as thin as possible since their presence necessarily reduces the light collecting power of the lens. By making the radial edge portions 12 and 12' as thin as possible, this effect is kept to a minimum and thus the lost light only amounts to a small percentage of the light collecting power of the lens. The combined thickness W of the radial edge portions of the two adjacent frame segments 12 and 12' should precisely compensate for the width of the cut used to section the lens. Thus W should be equal to the width of cut used to segment the lens.

Importantly, the frame segments 1 and lens sections 2, after assembly as described, will lie in the same plane, to result in a flat lens, and the lens sections 2 should be sufficiently well aligned with each other so that the fresnel lens grooves are properly matched between adjacent fresnel lens sections. As a result, the assembled framed lens is functionally identical to a large uncut lens with the exception of the obscuration produced by the adjoining edge portions 12 and 12' shown in FIGS. 3 and 8. The resulting composite frame assembly improves the rigidity of the lens during use to improve the reliability of the optical system. Also, the frame assembly can also now function as a means for mounting the composite lens upon a related structure such as the aforesaid telescope. However, for certain limited applications it may be possible to eliminate the frame segments in spite of these advantages.

After the large composite lens is used, the plurality of wedge shaped optical elements can be detached from each other by actuating detachable fasteners 3 and 4 to create a compact portable stack of optical elements, enabling the stack of elements to be readily carried by a person. Normally there is no need to detach lens sections 2 from frame segments 1.

Since numerous variations on the above description will readily occur to those skilled in the art, the scope of the invention is to be limited only to the terms of the following claims and art recognized equivalents thereto. For example, the invention is not to be restricted to fresnel lenses or mirrors or to flat light plastic sections 2, although such sections are preferred. Other types of detachable fasteners may be substituted for those described such as rapidly actuatable spring loaded latches or clamps. Also, some type of hinge fastener could be used such that the lens frame segments could be folded over each other while remaining connected together at the hinge points between them.

We claim:

1. Method of assembling a composite optical device which can be readily assembled and disassembled comprising the steps of:

(a) providing a plurality of flat optical element sections having edge portions together with a plurality of optical element frame segments having narrow ledge portions for supporting said optical element sections;

(b) fastening the edge portions of each optical element section to an associated frame segment ledge portion to thus provide a plurality of optical elements;

(c) upon the use of said composite optical device, detachably fastening a plurality of said optical elements together in a manner causing all of said ledge portions of said optical element frame segments to lie in a single plane, thereby to maintain the optical element sections in a coplanar relationship; and thereafter (d) unfastening said plurality of optical elements from each other to facilitate transportation of said optical device.

2. The method of claim 1 wherein the optical element sections are comprised of sections of a binary lens.

3. Method of claim 1 wherein each optical element section and each optical element frame segment is pie shaped and wherein step (c) is performed by detachably fastening outer arcuate peripheral portions of adjacent frame segments together.

4. The method of claim 3 wherein step (c) further includes detachably fastening central portions of said optical element sections together.

5. The method of claim 4 wherein each optical element section is substantially flat and thus coplanar with respect to its associated frame segment after being detachably fastened thereto.

6. The method of claim 3 wherein each optical element section is substantially flat and thus coplanar with respect to its associated frame segment after being fastened thereto.

7. The method of claim 1 wherein each optical element section is substantially flat and thus coplanar with respect to its associated frame segment after being fastened thereto.

* * * * *